United States Patent Office

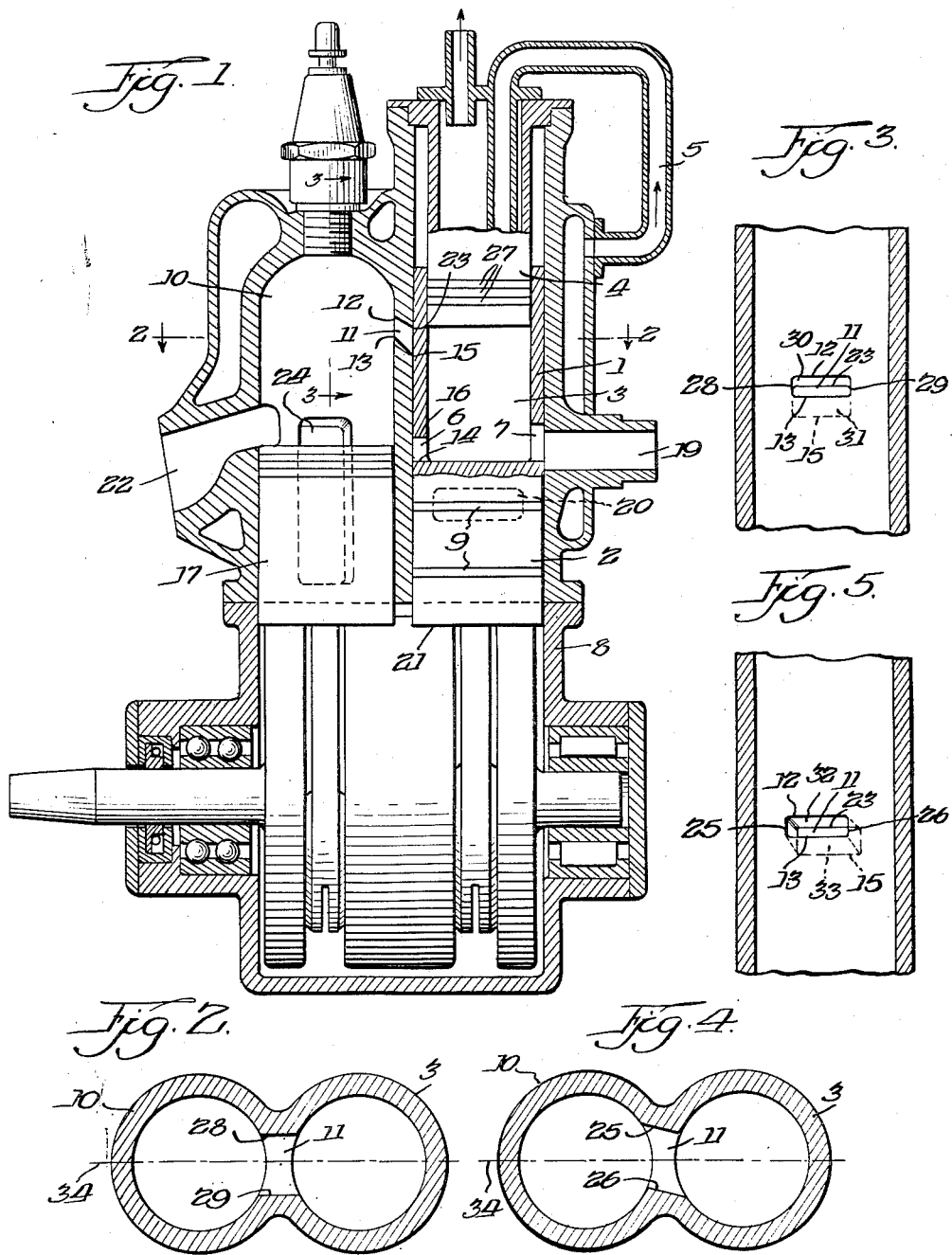

2,776,650
Patented Jan. 8, 1957

2,776,650
INTERNAL COMBUSTION ENGINES
Hans Georg Zimmermann, Karlsruhe, Germany Application April 29, 1952, Serial No. 284,880

Claims priority, application Germany May 10, 1951

5 Claims. (Cl. 123—69)

The present invention relates to injection-control means for the working-cylinder of a two-cycle internal combustion engine of the type employing air-scavenging prior to the injection of the air-fuel mixture.

A known type of two-cycle engine using a crankcase charging arrangement via injecting means possesses on the one hand the advantages of simplicity of construction and reliability, and on the other hand the disadvantages of lower power output, higher fuel consumption and higher thermal stress. These disadvantages are caused primarily by the less efficient charging the cylinder with fresh air-fuel mixture, due to losses of air-fuel mixture during the scavenging period and contamination of the air-fuel mixture with spent gases or products of combustion.

A special two-stroke cycle has already been proposed with air-scavenging and subsequent fuel charging via injection means, as also an internal combustion engine incorporating this process, whereby these disadvantages are obviated or mitigated.

A striking characteristic of this internal combustion engine is the arrangement of a working-cylinder and a charger-cylinder to form one cylinder unit, the whole unit operating above a common crankcase independently of other cylinder-units. In this case the connecting rods of the pistons of both cylinders are connected to a common crankshaft in such a manner that the charger-piston operates in advance of the working-piston.

The following advantages are obtained in this known arrangement.

The charger-cylinder in conjunction with the crankcase can have a twofold effect, provided the orifice diameters are sufficiently large thus avoiding injurious loss of volume. The twofold action of the charger-cylinder is achieved by arranging that the charger-piston draws in scavenging-air with its underside and fuel-air mixture with its upper side. The supply of scavenging medium and that of fuel-air mixture are therefore segregated in this engine.

As the working-piston also sucks in scavenging-air with its lower surface, the total supply of scavenging air is twice as great where the piston-stroke of both cylinders is identical, which has the further effect of obtaining rapid discharge of the exhaust gases from the working-cylinder during the scavenging process, thus easing the thermal stress on the engine.

The functioning of this type of engine is as follows:

The fuel-air mixture is drawn in by the upper-surface of the charger-piston, compressed in the charger-cylinder to a pressure above that prevailing at that moment in the working-cylinder, and is then transferred periodically via injection means by the shortest route from the charger-cylinder to the working-cylinder by the charger-piston, the outlet ports of the working-cylinder being closed. This transfer process is concluded when the working-piston has almost reached the point of ignition. With this previously proposed process it is possible firstly, to obviate practically entirely the fuel losses occurring in the known type of two-stroke engines with mixed scavenging, which loss may be very considerable in the higher speed ranges, and, secondly, to increase greatly the available cylinder charge. Generally speaking, this proposed type of engine achieves, by relatively simple means, an increase of power-output in relation to its capacity, coupled with reduced consumption of fuel and of "engine weight" "power" ratio.

An important part of this two-stroke action is the functioning of the periodic transfer process of fuel-air mixture from the charger cylinder to the working cylinder, which latter is already filled with scavenging-air.

An object of the present invention is to produce valve means for this transfer process, in order to simplify the production of a two-stroke internal combustion engine with air-scavenging and subsequent fuel-charging, to improve reliability and to suit the characteristic valveless two-stroke engine mechanism.

An embodiment of the present invention will now be described, by way of example, with reference to the accompanying drawing wherein:

Fig. 1 is a section through an engine of the type aforesaid showing the construction of the direction device according to the invention;

Fig. 2 is a section through the working-cylinder and charging cylinder on the line 2—2 of Fig. 1, showing one construction according to the invention;

Fig. 3 is a section through the working-cylinder on the line C—D of Fig. 1, showing details of the construction according to Fig. 2;

Fig. 4 is a section through the working-cylinder and charging cylinder similar to Fig. 2, showing a modification; and Fig. 5 is a section through the working-cylinder similar to Fig. 3, showing a modification.

The injection-control means comprises a sleeve-valve 1 integral with the charger-piston 2. The charger-cylinder 3 is sealed off in the region of its cylinder-head by a fixed sealing piston 4 fitted with piston-rings 27. The sealing-piston 4 is of hollow construction and is used for the purpose of cooling the sleeve-valve 1, whereby the said piston 4 may be incorporated in the circulatory cooling system 5 of an engine of the type with liquid or air cooling.

The outer diameter of the sealing-piston 4 is equal to the inner diameter of the sleeve-valve 1 less clearance. The outer diameter of the sleeve-valve 1, without taking clearance into account, is equal to the outer diameter of the charger-piston 2 and the inner diameter of the charger-cylinder 3. The sleeve-valve 1 is provided with slots 6, for the injection of fuel-air mixture from the charger-cylinder 3 to the working-cylinder 10, and slots 7 for the admission of the mixture to the charger cylinder. The lower edges of these slots lie, as a rule, at the same level as the crown of the charger-piston 2.

To ensure that there is no leakage between the charger-cylinder 3 and the crank-case 8, the charger-piston 2 is fitted with piston rings 9.

To provide temporary spatial communication between the working cylinder 10 and charger-cylinder 3 the intervening cylinder wall is provided with a through passage or transfer-port 11 for the mixture.

The upper edge 12 of this transfer-port 11 within the working-cylinder 10 is located on a level with or slightly lower than the earliest possible position of ignition advance. The location of the lower edge 13 on the working-cylinder wall is determined by the required direction of admission and by the necessary aperture diameter.

The upper edge 23 of the mixture transfer-port 11 on the wall of charger-cylinder 3 is approximately on a level with the lower edge 14 of the transfer slot 6 in the sleeve-valve 1 at the top dead centre of the charger-piston 2.

The level of the lower edge 15 of the mixture transfer-port 11 on the wall of the charger-cylinder 3, together with the upper edge 16 of the transfer slot 6 of the sleeve-valve 1, determine the commencement of the mixture-transfer process.

The level of the upper edge 16 of the transfer-slot 6 is so positioned that the sleeve-valve 1 begins to close the transfer-port 11 as soon as the crown 18 of the retarded working-piston 17 reaches the transfer-port 11.

The depth of the mixture inlet-slot 7 is equal to that of the mixture inlet-port 19 in charger-cylinder 3.

The inlet-port 20 for admitting air to the crankcase for ultimate use as scavenging-air is controlled in the normal manner by the lower edge 21 of the charger-piston 2. The exhaust-port 22 of the working-cylinder 10 is controlled by the working-piston 17.

The method of operation of the direction device for the air-fuel mixture transfer is as follows:

At the bottom dead centre of the charger-piston 2, the inlet-port 19 for the mixture is fully open since at this point the apertures of inlet-slot 7 and of the inlet-port 19 coincide. At the same time the sleeve-valve 1 closes the transfer-port 11, and thus seals off the working-cylinder 10 from charger-cylinder 3.

In the course of the further motion of charger-piston 2 towards the top dead centre, the fuel-air mixture drawn into the charger-cylinder 3 by the charger-piston 2 is compressed. When the upper edge 16 of the mixture transfer-slot 6 of the sleeve-valve 1 has reached the lower edge 15 of the mixture transfer-port 11, the transfer of fuel-air mixture from the charger-cylinder 3 to the working-cylinder 10 begins. At this point on the engine cycle the scavenging process in the working-cylinder 10, by the scavenging air drawn in at 24 during the downward stroke of the piston 17 at 24, has been completed during the upward stroke of the piston 17, and the fuel-air mixture in the charger-cylinder 3 has been compressed to a pressure above that prevailing in the working-cylinder 10. When the lower edge 14 of the mixture transfer slot 6 in the sleeve-valve 1 has reached the upper edge 23 of the transfer-port 11 in the charger-cylinder, the charger-piston 2 is in the position of the top dead centre and the transfer of fuel-mixture is complete.

At the same moment, the retarded working-piston 17 is approaching ignition-point, the crown 18 of this piston being level with the upper edge 12 of the transfer-port 11 in the working-cylinder wall. The working-piston 17 now proceeds towards its top dead centre and seals the transfer-port 11. When the crown 18 of the working-piston 17 has once again reached the transfer-port 11 on its subsequent downward stroke, the sleeve-valve 1 has already begun once more to close the transfer-port 11 as a consequence of the advanced position of the charger-piston 2, the sealing being completed when the crown 18 of the working-piston 17 begins to uncover the transfer-port 11.

The provision of the sleeve-valve 1 according to the invention permits an arrangement of the mixture transfer-port 11 results in the following:

1. During the scavenging process in the working-cylinder 10 a turbulence occurs in this cylinder due to the employment of the familiar reverse scavenging. This turbulence is initiated as the scavenging-air from the inlet port 20 and crankcase enters from the scavenging-air admission port 24 whose communication with the crankcase is controlled by the working piston 17, rises along the mid-cylinder wall, follows the periphery of the semi-spherical combustion-chamber and passes along the cylinder-wall on the exhaust-port side on its way to the outlet port 22. This turbulence is maintained, within certain limits, even during compression in the working-cylinder 10, after the exhaust-port 22 has closed. In the case where the admission-point of the mixture transfer-port 11 lies at a tangent to the periphery of the combustion chamber, the fuel-air mixture admitted to the working-cylinder 10 can flow in the same direction as the previously compressed scavenging-air and has therefore the least possible flow-resistance to overcome.

2. By oblique positioning (relative to the crank-shaft axis) of the perpendicular side-faces 25, 26 of the mixture transfer-port 11 (see Figs. 4 and 5) the fuel-air mixture flows into the working-cylinder 10 with a vortex motion around the longitudinal axis of the working-cylinder thereby enhancing the mixing of scavenging-air and fuel-air mixture in the working-cylinder 10.

3. In the arrangement described of a mixture transfer-port 11 in conjunction with a sleeve-valve 1 the injurious area in the charger-cylinder 3 is reduced practically to zero.

4. In the transfer-port arrangement described, the fuel-air mixture entering the transfer-port 11 at high velocity follows the periphery of the combustion-chamber and sets up a turbulence continuing beyond the moment of ignition. Such a turbulent agitation of the fuel-air mixture in the combustion-chamber shortly before and during combustion has a favourable effect on the course of combustion for the following reasons:

The well-known "knocking" effect in "Otto cycle" engines occurs at the end of combustion, in cases where the compression is excessive, relative to the octane-rating of the fuel. When combustion takes place by ignition, the temperatures and pressures rise very rapidly. Those portions of the fuel-air mixture which have not been reached by the flame-front progressing outwards from the sparking-plug during this increase of temperature and pressure, ignite with detonation, independently of the normal process of combustion, and cause the well-known "knocking" sounds which result in injurious effects to the entire mechanism of the engine.

Assuming this explanation of the "knocking" process to be correct, it would appear that a turbulent agitation of the fuel-air mixture in the combustion chamber, during the combustion process, has the secondary effect of assisting the propagation of combustion, thereby reducing the tendency of the engine to "knock." As a consequence of this, the compression-ratio in the working-cylinder for a fuel of given octane-rating may be increased, whereby greater efficiency in performance and reduction of fuel-consumption are achieved, due to the improved thermal action accompanying the higher compression.

5. By making the sleeve-valve 1 integral with the charger-piston 2 it requires no additional drive, thus reducing the cost of manufacture and the weight of the engine, as compared with rotary valve-control.

6. Reliability is increased and the necessary maintenance reduced.

7. In practice, the thermal stress to which the direction device is submitted is kept within reasonable limits because:

(a) The surface receiving heat is considerably smaller than that conducting heat away.

(b) Sufficiently large apertures are provided for withdrawing heat.

The thermal action on the sleeve valve 1 can be further reduced by the hollow part of the sealing piston 4, employing air blow or liquid cooling 5.

The surface of the mixture transfer-port 11 is submitted to the thermal stress of almost stationary conbustion gases which effect is counteracted by the high velocity flow of gases at a considerably lower temperature.

Fig. 2 shows the lateral surfaces 28, 29 of the mixture transfer port 11 which run parallel to the common axis 34 of the working-cylinder 10 and of the charger-cylinder 3.

Fig. 3 shows how the upper and lower transfer-port surfaces 30, 31 may be inclined to the horizontal plane.

The lateral surfaces 25, 26 of the mixture transfer port 11 may alternatively be at an oblique angle to the vertical plane as shown at Figs. 4 and 5, the upper and lower transfer ports being indicated by 32 and 33.

The arrangement according to Figs. 4 and 5 provides an additional vortex motion around the axis of the working-cylinder 10.

The edges in Figs. 1, 3 and 5 have been denoted by similar reference numerals for the sake of clarity.

Changes may be made within the scope and spirit of the appended claims.

I claim:

1. In a two-cycle internal combustion engine having an operating unit disposed upon a common crankcase and comprising at least one charge cylinder and one work cylinder and for each cylinder a corresponding piston connected to a common crankshaft disposed in said crankcase and having a first inlet port formed in the wall of said charge cylinder for admitting an air-fuel mixture thereinto and a transfer port formed in a wall extending between said cylinders for transferring air-fuel mixture from said charge cylinder into said work cylinder and having an exhaust port formed in the wall of said work cylinder; a second inlet port formed in the wall of said work cylinder and communicating with the crankcase for separately admitting air drawn from said crankcase into said work cylinder, said charge piston being during its suction stroke operative to draw air-fuel mixture from said first inlet port into the associated charge cylinder and said work piston being during its suction stroke operative to open said exhaust port and to draw air from said crankcase through said second inlet port into the associated work cylinder and being during its compression stroke operative to close said exhaust port and said second inlet port and to partially compress the air drawn into the corresponding work cylinder, said charge piston being during its compression stroke operative to close said first inlet port and to partially compress the air-fuel mixture drawn into the associated charge cylinder and being further operative to open said transfer port near the end of its compression stroke to inject said partially compressed air-fuel mixture into said work cylinder for turbulent intermixture thereof with the partially compressed air therein and to thereafter close said transfer port, and said work cylinder being during its further compression stroke operative to compress the intermixed product for ignition thereof.

2. The structure and cooperation of parts as set forth in claim 1, comprising a sleeve extending from said charge piston for controlling the opening and closing of said transfer port.

3. The structure and cooperation of parts as set forth in claim 1, wherein said transfer port extends at an incline upwardly from said charge cylinder to said work cylinder for similarly injecting said partially compressed air-fuel mixture from said charge cylinder into said work cylinder for turbulent intermixture thereof with the partially compressed air in said work cylinder.

4. The structure and cooperation of parts as set forth in claim 1, wherein said transfer port extends tangentially to the axes of said cylinders for similarly injecting said partially compressed air-fuel mixture from said charge cylinder into said work cylinder for turbulent intermixture thereof with the partially compressed air in said work cylinder.

5. The structure and cooperation of parts as set forth in claim 1, wherein said transfer port extends tangentially to the axes of said cylinders and at an incline upwardly from said charge cylinder to said work cylinder for similarly injecting said partially compressed air-fuel mixture from said charge cylinder into said work cylinder for turbulent intermixture thereof with the partially compressed air in said work cylinder.

References Cited in the file of this patent

UNITED STATES PATENTS

| 1,104,596 | Woodland | July 21, 1914 |
| 1,114,521 | Reese et al. | Oct. 20, 1914 |
| 1,313,534 | Jayne | Aug. 19, 1919 |
| 1,350,260 | Long | Aug. 17, 1920 |
| 1,510,620 | Hentschke | Oct. 7, 1924 |
| 1,686,236 | Hetlesater | Oct. 2, 1928 |
| 1,725,139 | Hetlesater | Aug. 20, 1929 |
| 2,288,018 | Neuland | June 30, 1942 |
| 2,464,228 | Hall | Mar. 15, 1949 |

FOREIGN PATENTS

| 16,865 | Great Britain | July 15, 1914 |
| 358,156 | Germany | Sept. 5, 1922 |
| 887,434 | France | Aug. 16, 1943 |